(12) United States Patent
Mamei et al.

(10) Patent No.: US 7,743,789 B2
(45) Date of Patent: Jun. 29, 2010

(54) VALVE FOR HYDRAULIC BRAKING OF WORK MACHINES OR THE LIKE

(75) Inventors: Eronne Mamei, Modena (IT); Omer Mamei, Modena (IT); Enrico Mamei, Modena (IT)

(73) Assignee: Studio Tecnico 6M S.R.L., Modena (IL)

( * ) Notice: Subject to any disclaimer, the term of this patent is extended or adjusted under 35 U.S.C. 154(b) by 637 days.

(21) Appl. No.: 11/524,466

(22) Filed: Sep. 21, 2006

(65) Prior Publication Data

US 2007/0068586 A1  Mar. 29, 2007

(30) Foreign Application Priority Data

Sep. 29, 2005 (IT) .................. MO2005A0247

(51) Int. Cl.
*F16K 11/07* (2006.01)

(52) U.S. Cl. .................. 137/625.68; 251/104; 251/110

(58) Field of Classification Search ............ 137/625.68; 251/101, 102, 104, 110
See application file for complete search history.

(56) References Cited

U.S. PATENT DOCUMENTS

| | | | | |
|---|---|---|---|---|
| 1,354,440 | A * | 9/1920 | Mowry ........................ | 137/242 |
| 1,511,554 | A * | 10/1924 | Woodring ................. | 137/596.1 |
| 2,223,032 | A * | 11/1940 | Farmer ........................ | 251/102 |
| 3,084,899 | A * | 4/1963 | Dever et al. ............. | 137/625.68 |
| 3,221,770 | A * | 12/1965 | Faisandier .............. | 137/625.68 |
| 3,502,374 | A * | 3/1970 | Billeter .................. | 137/625.68 |
| 3,515,441 | A * | 6/1970 | Stein ...................... | 137/625.68 |
| 4,146,102 | A * | 3/1979 | Balzer .................... | 137/625.68 |
| 4,159,102 | A * | 6/1979 | Fallon et al. ................ | 251/104 |
| 4,184,512 | A * | 1/1980 | Pignolet ................. | 137/625.68 |
| 4,341,243 | A * | 7/1982 | Melocik ................. | 137/625.68 |
| 4,777,981 | A * | 10/1988 | Petro ...................... | 137/625.68 |
| 5,482,085 | A * | 1/1996 | Wasson .................. | 137/625.68 |
| 6,152,179 | A * | 11/2000 | Buttner et al. .......... | 137/625.68 |
| 6,441,591 | B2 | 8/2002 | Nokkonen | |
| 6,886,593 | B2 * | 5/2005 | Madden et al. ........ | 137/625.68 |
| 2002/0121882 | A1 | 9/2002 | Matsuo et al. | |
| 2004/0178776 | A1 | 9/2004 | Hansen et al. | |
| 2005/0242792 | A1 | 11/2005 | Zinn | |

FOREIGN PATENT DOCUMENTS

| | | | |
|---|---|---|---|
| DE | 38 17 313 | A1 | 8/1989 |
| FR | 2 857 705 | A | 1/2005 |
| GB | 1 214 713 | A | 12/1970 |
| WO | 2005038920 | A | 4/2005 |

* cited by examiner

*Primary Examiner*—John Rivell
*Assistant Examiner*—Craig Price
(74) *Attorney, Agent, or Firm*—Modiano & Associati; Albert Josif; Daniel J. O'Byrne

(57) ABSTRACT

A valve for the hydraulic braking of work machines comprises an outer casing provided with a longitudinal seat and with at least one-to-third connection port, a slider slideable along the seat and provided with a contoured portion to control passage of the fluid through the connecting ports, and a reaction surface which is connected to the third connecting port, and an actuation for actuating sliding of the slider in the seat, which comprises first elastic element, interposed between the casing and the slider to contrast pressurized fluid thrust against the reaction surface, second elastic element interposed between a first abutment element of the slider and a second abutment element arranged inside the casing, which are adapted to contrast thrust of the first elastic element, and a manual actuation for actuating loading/unloading of the second elastic element.

19 Claims, 3 Drawing Sheets

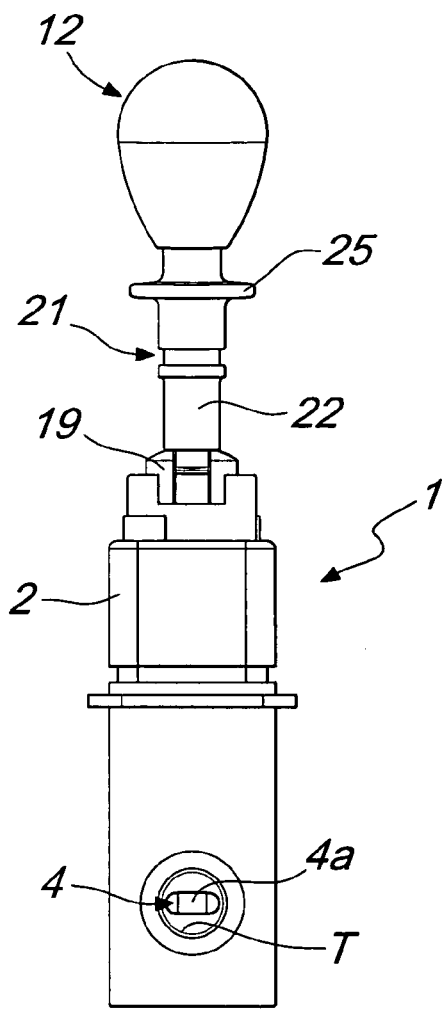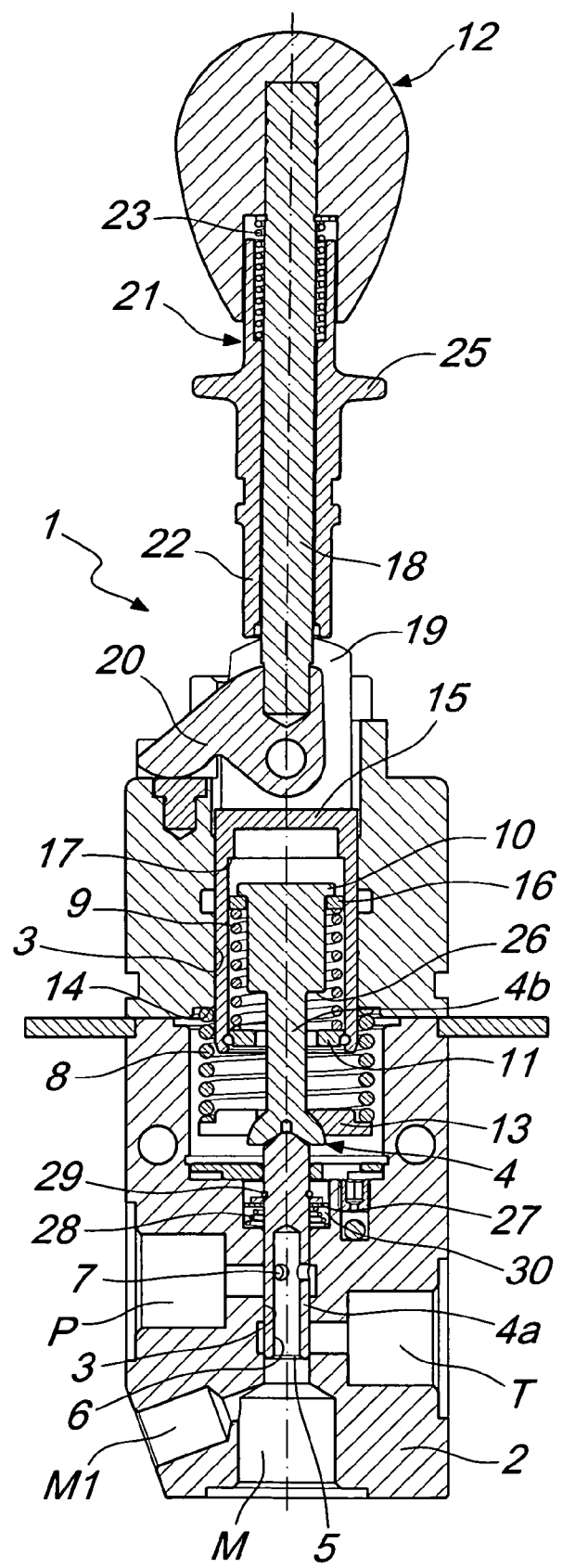
Fig.3
Fig.4

VALVE FOR HYDRAULIC BRAKING OF WORK MACHINES OR THE LIKE

The present invention relates to a valve for hydraulic braking of work machines or the like.

BACKGROUND OF THE INVENTION

It is known that fixed and movable work machines used in industrial and nonindustrial fields use stopping or parking brakes which are actuated by large locking springs and which, once engaged, allow to slow the work machine while it is moving or to keep it stationary safely.

In the normal operation of work machines, the brakes are kept released by means of a hydraulic system provided with jacks which contrast the elastic force of the springs.

By modulating the pressure of the fluid (usually but not exclusively oil) inside the jacks, it is possible to control the resulting force that acts on the brakes and therefore adjust the intensity of the braking force.

This modulation is usually performed by using suitable manually actuated hydraulic valves, wherein the term "manual" references any intervention performed directly by the operator for example by means of a lever, pedal or the like.

Known types of valve are constituted usually by an outer casing provided with ports for connection respectively to a pressurized oil supply pump, to an oil discharge tank and to the brake locking jacks.

A longitudinal seat is formed within the casing and a contoured slider slides therein, allowing to connect to each other the connecting ports, particularly to send pressurized fluid to the jacks and release the brakes, or to discharge the contents into the discharge tank and allow the springs of the brakes to slow/block the work machine.

The slider is moved by means of the actuation lever or pedal in contrast with two springs arranged inside the casing; in detail, a first spring acts directly on the slider and control the pressure of the oil fed to the jacks, while a second spring is designed to load the first spring with a force which is sufficient to deliver the brake release pressure.

When the brakes are engaged and the work machine is stationary, these known types of valve are provided with a bolt which is actuated by a contrast spring and locks rigidly the lever or pedal, prevents accidental release of the brakes, and avoids the onset of potentially dangerous situations.

These traditional types of valve are not free from drawbacks, including the fact that due to the use of two slider contrast springs, one designed to load the other, the force that the operator needs to apply to actuate the lever or pedal is often considerable and therefore said operation in some cases is rather tiring, especially if it is performed several times.

Moreover, in conventional valves the openings for the passage of the fluid within the slider sliding seat are often excessively narrow, allowing, other conditions being equal, the passage of small flow-rates of oil and therefore making the braking system scarcely reactive to the commands imparted by the operator; in practice, this causes difficulties in modulating the braking action.

Moreover, it is noted that the system for engaging the bolt to the lever or pedal is sometimes complicated from a constructive and functional standpoint.

SUMMARY OF THE INVENTION

The aim of the present invention is to eliminate the drawbacks noted above of the background art, by providing a valve for the hydraulic braking of work machines or the like which allows to engage and release the brakes in a particularly simple, convenient manner and most of all with limited effort on the part of the operator.

Within this aim, another object of the present invention is to make the braking system particularly reactive to commands and allow easy modulation of the braking action.

Another object of the present invention is to provide a system for locking the valve in safe conditions which is very simple both structurally and functionally.

Another object of the present invention is to provide a valve having a structure which is simple, relatively easy to provide in practice, safe in use, effective in operation, and has a relatively low cost.

This aim and these and other objects that will become better apparent hereinafter are achieved by the present valve for the hydraulic braking of work machines or the like, which comprises an outer casing provided with a longitudinal seat and with at least one first port for the connection of said seat to a pumping assembly for feeding pressurized fluid, at least one second port for connecting said seat to a fluid discharge and recovery tank, and at least one third port for connecting said seat to the braking system of a work machine or the like, a slider which can slide within said seat and is provided with a contoured portion which is suitable to allow/prevent the passage of said fluid through said connecting ports, a reaction surface which is connected to said third connecting port, and means for actuating the sliding of said slider in said seat in contrast with said pressurized fluid that affects said reaction surface, characterized in that said actuation means comprise first elastic means, which are substantially interposed between said casing and said slider and are adapted to contrast the thrust of said pressurized fluid against said reaction surface, second elastic means which can be interposed substantially between a first abutment element associated with said slider and a second abutment element arranged inside said casing, which are adapted to contrast the thrust of said first elastic means, and means for manually actuating the loading/unloading of said second elastic means.

BRIEF DESCRIPTION OF THE DRAWINGS

Further characteristics and advantages of the present invention will become better apparent from the following detailed description of a preferred but not exclusive embodiment of a valve for the hydraulic braking of work machines or the like, illustrated by way of non-limiting example in the accompanying drawings, wherein:

FIG. 3 is a side view of the valve according to the invention in an intermediate braking modulation configuration;

FIG. 4 is a sectional view of the valve of FIG. 3;

DESCRIPTION OF THE PREFERRED EMBODIMENTS

Figure 1:
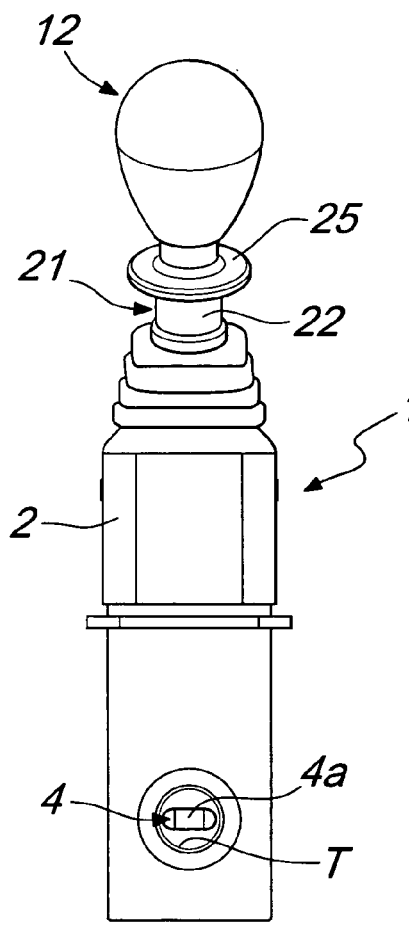
FIG. 1 is a side view of the valve according to the invention in a configuration which corresponds to the full release of the brakes.

With reference to the figures, the reference numeral 1 generally designates a valve for the hydraulic braking of work machines or the like.

The valve 1 comprises an outer casing 2, in which there is a longitudinal sliding seat 3 for a slider 4, a first port P for connecting the seat 3 to a pumping assembly for feeding pressurized fluid, a second port T for connecting the seat 3 to a fluid recovery and discharge tank, a third port M for connecting the seat 3 to the jacks of the braking system of a work machine or the like, and a fourth port M1, which is connected to the third port M and is designed for the coupling of a measuring means for measuring the pressure of the jacks, such as a pressure-controlled switch or the like.

The slider 4 is constituted by a flow control element 4a and by a pusher spool 4b, both of which are elongated longitudinally with respect to the seat 3 and are kept in mutual contact.

The flow control element 4a is merely a contoured portion which is suitable to allow/prevent the passage of the fluid through the connecting ports P, T and M and on which there is a reaction surface which substantially faces the third port M and is sensitive to the pressure of the fluid at the jacks.

In detail, said contoured portion is provided with an end 5 which faces axially the third port M and laterally faces the second port T; the movement of the slider 4 in a first direction away from the third port M in practice is adapted to connect the second port T and the third port M and to discharge the fluid from the jacks to the discharge tank (which corresponds to an increase in the braking capacity of the brakes).

Further, the contoured portion 4a comprises a longitudinal cavity 6, which is open at the end 5 that faces the third port M, and a plurality of transverse openings 7 for connecting the longitudinal cavity 6 to the first port P; the movement of the slider 4 in a second direction for sliding toward the third port M in practice is adapted to connect the first port P and the third port M and send the fluid to the jacks (which corresponds to a reduction in the braking capacity of the brakes).

The reaction surface of the flow control element 4a is formed in practice by the edge of the end 5 and by the bottom of the longitudinal cavity 6.

Advantageously, the spool 4b is constituted by a pivot which has a circular cross-section and a variable thickness and is associated with sliding actuation means for actuating the sliding of the slider 4 in the seat 3 in contrast with the pressurized fluid that strikes or anyway contacts said reaction surface.

Said actuation means comprise first elastic means 8, which are interposed between the casing 2 and the slider 4 and are adapted to contrast the thrust of the fluid that strikes the reaction surface, second elastic means 9, which can be interposed between a first abutment element 10 associated with the slider 4 and a second abutment element 11 arranged within the casing 2 and are adapted to contrast the thrust of the first elastic means 8, and manual actuation means 12 for manually actuating the loading/unloading of the second elastic means 9.

In particular, the first elastic means 8 are constituted by a first preloaded helical compression spring, which is wound around the spool 4b and has it ends in abutment between an abutment plate 13, in contact with the end of the spool 4b that is adjacent to the flow control element 4a, and a supporting surface 14, which is formed within the casing 2 and is directed toward the flow control element 4a.

Advantageously, the second elastic means 9 are constituted by a second preloaded helical compression spring, which is also wound around the spool 4b.

The first abutment element 10 on which the second helical spring 9 can engage is constituted by a shoulder which is provided at the end of the spool 4b that lies opposite the contoured portion 4a; the second abutment element 11 is constituted instead by a supporting washer, which is arranged around a substantially central portion of the slider 4 and can slide longitudinally with respect to the seat 3.

The manual actuation means 12 are constituted by a mechanism for moving the washer 11 between a spaced configuration and a closer configuration with respect to the shoulder 10.

In detail, they comprise a cup-shaped element 15, which can slide along the seat 3, surrounds the end part of the spool 4b and is provided with a closed end, which is arranged proximate to the shoulder 10, and an open end, which is associated with the washer 11.

The second helical spring 9 is arranged inside the cup-shaped element 15 and rests directly at one end on the washer 11 and is adjacent, at the opposite end, to a retention ring 16 which surrounds the spool 4b.

Said retention ring can slide with respect to the cup-shaped element 15 and during use it can rest against the shoulder 10 of the spool 4b or against an abutment recess 17 provided within said element.

When the retention ring 16 rests against the shoulder 10, the elastic force of the second helical spring 9 is applied to the slider 4 and is subtracted from the elastic force produced by the first helical spring 8 in order to contrast the pressure of the fluid that acts against the flow control element 4a; when instead the retention ring 16 is adjacent to the abutment recess 17, the second helical spring 9 has no effect on the slider 4 and remains preloaded between said retention ring and the washer 11.

In the particular embodiment of the invention shown in the Figures, an actuator device of the lever type is associated with the cup-shaped element 15 and allows to slide said cup-shaped element along the seat 3; however, alternative embodiments are also possible in which said device can be of the pedal-operated type.

In particular, said lever device has a lever 18, which is associated rotatably with a body 19 for coupling to the cup-shaped element 15 and is provided with an eccentric portion 20, which can engage in abutment against the casing 2 and is adapted to convert the rotary motion of the lever 18 into the sliding motion of the cup-shaped element 15 along the seat 3.

Removable locking means 21 for the removable locking of the lever 18 in a stroke limit configuration that corresponds to the full engagement of the brakes of the work machine are provided on the lever 18.

Said removable locking means comprise a tubular body 22, which can slide coaxially around the lever 18, third elastic means 23, which are interposed between the lever 18 and the tubular body 22 and are adapted to press said tubular body against the coupling body 19, and a slot 24, which is formed on the coupling body 19 and in which the tubular body 22 can engage in the stroke limit configuration.

During the rotation of the lever 18, in practice, the tubular body 22 slides on the spherical head of the coupling body 19 until, at the stroke limit, it is pushed into the slot 24 by virtue of the action of the third elastic means 23; to release the lever 18 from the stroke limit configuration, the tubular body 22 is provided externally with a grip wing 25, which allows to disengage it from the slot 24.

Conveniently, at the stroke limit configuration the washer 11 is adapted to be placed in contact against an abutment surface 26 of the spool 4b of the slider 4 and move the flow control element 4a away from the third port M, so as to leave open the passage between the second and third ports T and M and discharge completely the pressure of the fluid at the jacks.

The valve 1 according to the invention is completed by virtue of stabilizer means for stabilizing the sliding of the slider 4 in the seat 3.

In particular, said stabilizer means comprise a disk 27, which is fitted coaxially around the flow control element 4a and is kept rigidly, jointly coupled thereto by way of a conical helical spring 28, which pushes said disk against a locking ring 29.

The disk 27 slides snugly within a portion of the seat 3 and forms, together with the internal walls of the casing 2, an isolated chamber 30; the movement of the disk 27 by the flow control element 4a pumps, by seepage, the fluid in input and in output from the chamber 30 and therefore dampens the vibrations of the slider 4.

The operation of the present invention is as follows: with the lever 18 in the position as in FIG. 1, the retention ring 16 rests on the abutment recess 17, the second helical spring 9 does not affect the sliding of the spool 4b, and the slider 4 is in a balanced position, in which the thrust of the first helical spring 8 is balanced by the pressure of the fluid at the jacks.

This configuration corresponds to the condition in which the jacks are pressurized and the brakes are released: in practice, the pressure of the fluid at the jacks is determined by the extent of the preloading of the first helical spring 8.

By turning the lever 18, the cup-shaped element 15 slides within the seat 3 until it places the shoulder 10 in contact with the retention ring 16 and thus applies the preloading of the second helical spring 9 to the slider 4.

Figure 2:
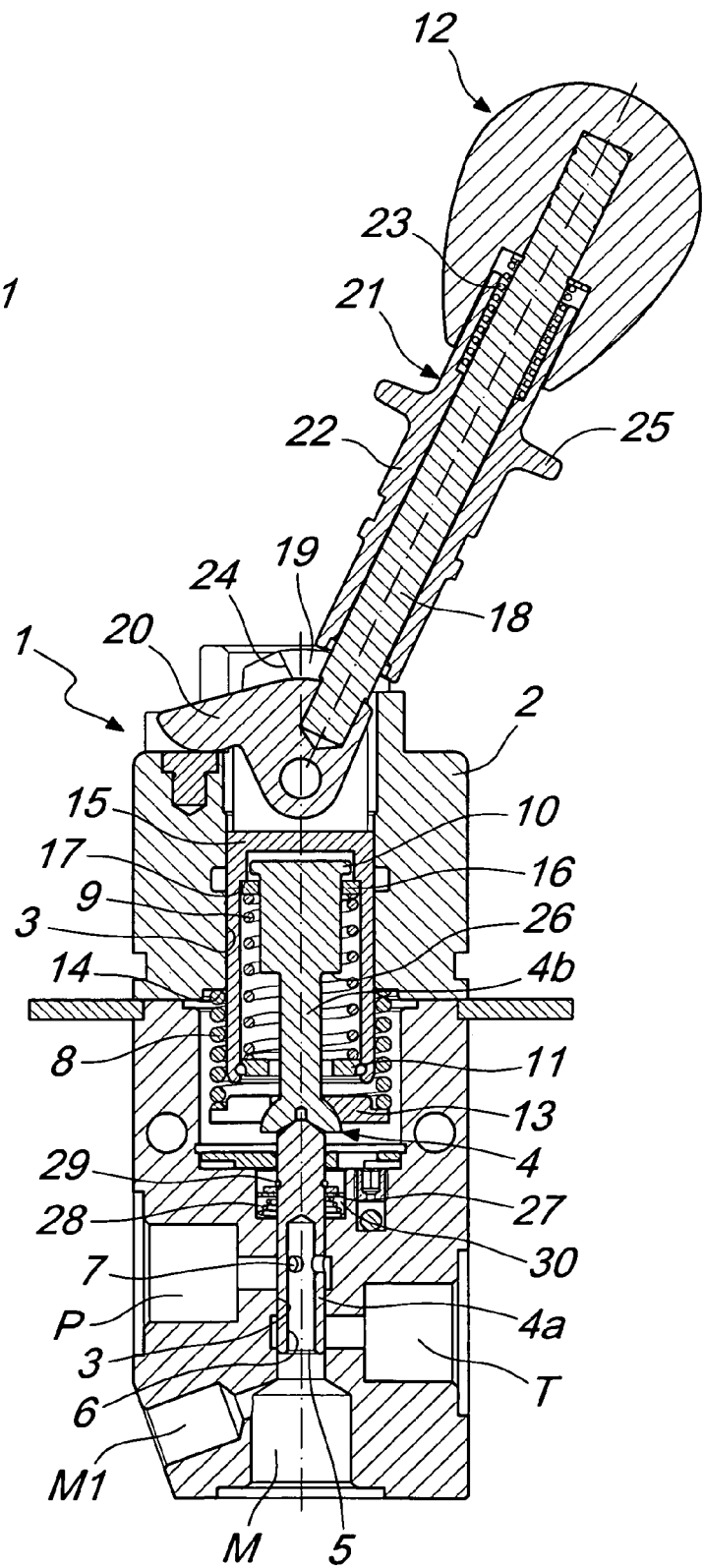
FIG. 2 is a sectional view of the valve of FIG. 1.
Figures 5, 6:
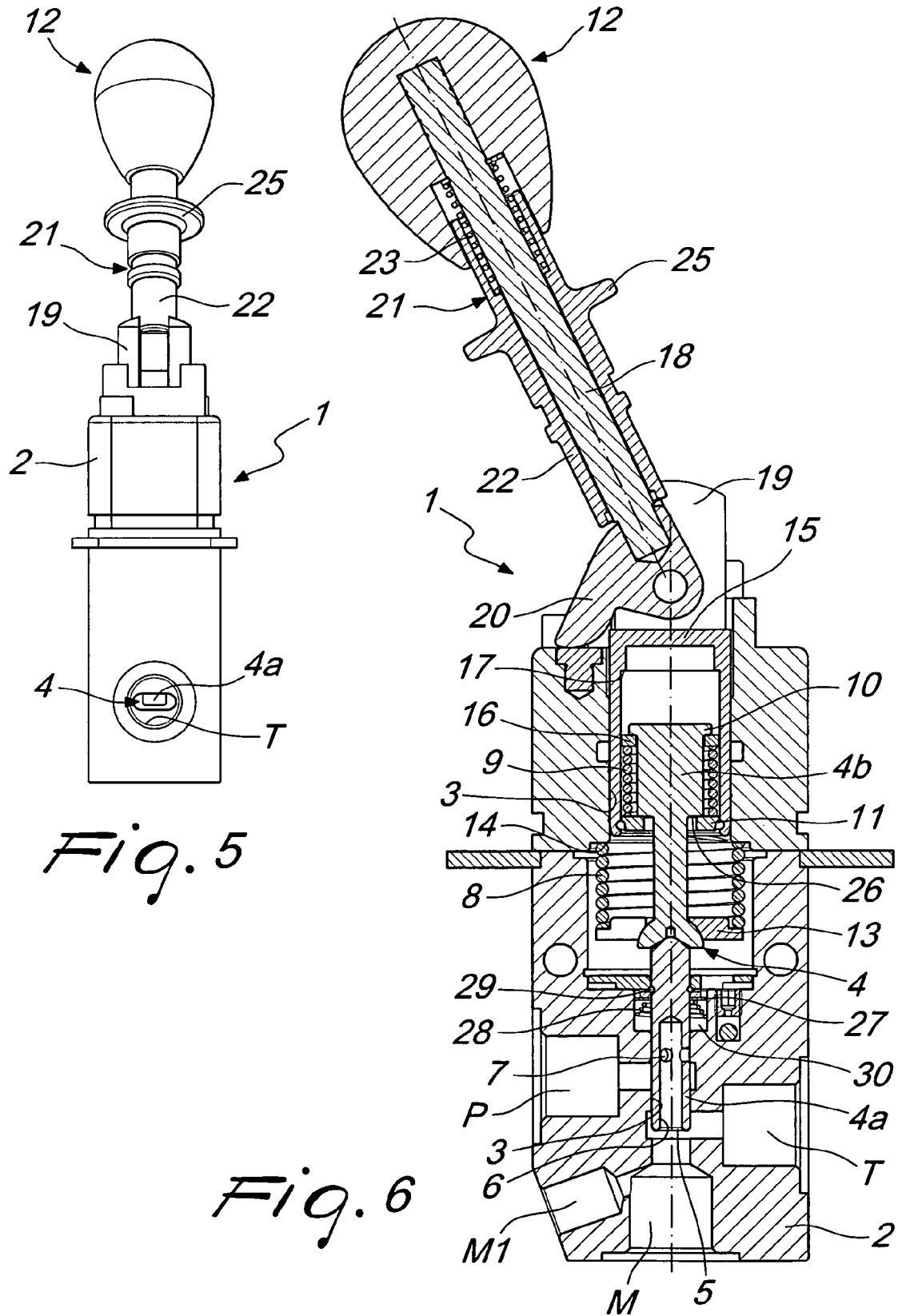
FIG. 5 is a side view of the valve according to the invention in a configuration which corresponds to the full engagement of the brakes.
FIG. 6 is a sectional view of the valve of FIG. 5.

Accordingly, the thrust of the first helical spring 8 is reduced by the value equal to the preloading of the second helical spring 9, the flow control element 4a performs a translational motion, opening the passage between the second port T and the third port M and discharging most of the pressure of the fluid to the jacks, until a new balanced configuration (FIG. 2) is achieved for the slider 4.

At this point, by turning the lever 18 further, the force of the first helical spring is contrasted increasingly by the compression of the second helical spring 9, allowing the gradual modulation of the pressure of the jacks and therefore of the braking action.

At the stroke limit configuration of the lever 18 (FIG. 3), the washer 11 engages the abutment surface 26 and lifts the slider 4, keeping stably open the passage between the second port T and the third port M and permanently discharging the pressure of the jacks.

In this configuration, the tubular body 22 is pushed into the slot 24 and the brakes remain locked until, by pushing on the grip wing 25, the lever 18 is disengaged again.

In practice it has been found that the described invention achieves the proposed aim and objects and in particular the fact is stressed that differently from traditional valves, the actuation of the actuation lever is always rather simple and requires little effort.

Moreover, the present invention allows to achieve a rapid pressure drop in the initial steps of the discharge of the jacks, leaving most of the stroke of the lever for more simple brake control.

Moreover, one should not forget that the passage port between the jacks and the discharge has considerable dimensions, which are proportional to the entire diameter of the flow control element, facilitating the reactivity of the braking system.

Finally, attention is called to the particular simplicity and functionality of the lever locking system.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the scope of the protection of the appended claims.

The disclosures in Italian Patent Application No. MO2005A000247 from which this application claims priority are incorporated herein by reference.

What is claimed is:

1. A valve for the hydraulic braking of work machines, comprising: an outer casing provided with a second abutment element thereinside, with a longitudinal seat and with at least one first port for connection of said seat to a pumping assembly for feeding pressurized fluid; at least one second port for connecting said seat to a fluid discharge and recovery tank; at least one third port for connecting said seat to a braking system of a work machine; a slider which is slideable along said seat and provided with a contoured portion, for allowing/preventing passage of the fluid through said first, second and third connecting ports; and with a first abutment element; a reaction surface connected to said third connecting port; and actuation means for actuating sliding of said slider in said seat in contrast with said pressurized fluid that contacts said reaction surface; and wherein said actuation means comprise: first elastic means, which are interposed between said casing and said slider and are adapted to contrast a thrust of said pressurized fluid against said reaction surface; second elastic means which are interposed between said first abutment element and said second abutment element to contrast the thrust of said first elastic means, and manual actuation means for manually actuating loading/unloading of said second elastic means, and wherein said slider comprises at least one abutment surface, which is movable by said second abutment element at a stroke limit configuration.

2. The valve of claim 1, wherein at least one among said first and second elastic means is of a compression preloaded type.

3. The valve of claim 1, wherein said manual actuation means are constituted by a mechanism for moving said second abutment element between a spaced configuration and a closer configuration with respect to said first abutment element.

4. The valve of claim 1, wherein said first abutment element is formed by a first shoulder which is formed at an end of said slider which lies opposite said contoured portion.

5. The valve of claim 4, wherein said second abutment element is formed by a supporting washer, which is arranged around a central portion of said slider and is slideable longitudinally with respect to said seat.

6. The valve of claim 3, wherein said manual actuation means comprise at least one cup-shaped element for containing said second elastic means, which is slideable along said seat around said slider and is provided with a closed end, which is arranged proximate to said first abutment element, and with an open end, which is connected with said second abutment element.

7. The valve of claim 6, wherein said manual actuation means comprise at least one actuation device of a lever type.

8. The valve of claim 7, wherein said manual actuation means comprise at least one lever rotatably associated with a body for coupling to said cup-shaped element, said at least one lever being further provided with an eccentric portion, which is engageable by abutment against said casing and is adapted to convert rotary motion of said at least one lever into sliding motion of said cup-shaped element.

9. The valve of claim 8, wherein said manual actuation means comprise means for removable locking of said at least one lever in said stroke limit configuration which corresponds to a brake engagement of the work machine.

10. The valve of claim 9, wherein said removable locking means comprise a tubular body slideable around said at least one lever, third elastic means which are interposed between said at least one lever and said tubular body and are adapted to push said tubular body against said coupling body, and a slot formed in said coupling body, in which said tubular body is engageable in said stroke limit configuration.

11. The valve of claim 10, wherein said removable locking means comprise at least one grip wing, which is associated externally with said tubular body.

12. The valve of claim 1, wherein said first elastic means comprise at least one first helical spring, which is wound around said slider and is arranged in abutment between an abutment plate in contact with said slider and a supporting surface which is formed within said outer casing and is directed toward said contoured portion of the slider.

13. The valve of claim 12, wherein said second elastic means comprise at least one second helical spring, which is wound around said slider within said cup-shaped element.

14. The valve of claim 1, further comprising stabilizer means for stabilizing sliding of said slider in said seat.

15. The valve of claim 14, wherein said stabilizer means comprise at least one disk, which is kept coupled around a flow control element and is slideable snugly within said seat.

16. The valve of claim 14, wherein said contoured portion of the slider is provided with an end which faces axially said third connecting port and faces laterally said second connecting port, the movement of said slider in a first sliding direction being adapted to connect said second and third connecting ports.

17. The valve of claim 16, wherein said contoured portion comprises at least one longitudinal cavity, which is open at said end which faces the third connecting port, and at least one transverse opening for connecting said cavity to said first connecting port, a movement of said slider in a second sliding direction, which is opposite to said first sliding direction, being adapted to connect said first and third connecting ports.

18. The valve of claim 1, wherein said casing is provided with at least one fourth pan for coupling of a pressure measuring means, which is connected to said third port.

19. A valve for the hydraulic braking of work machines, comprising:
an outer casing provided with a longitudinal seat and with at least one first port for connection of said seat to a pumping assembly for feeding pressurized fluid, with at least one second port for connecting said seat to a fluid discharge and recovery tank, and with at least one third port for connecting said seat to a braking system of a work machine;
a slider which is slidable along said seat and is provided with a contoured portion, which is suitable to allow or prevent passage of the fluid through said connecting ports, and with a reaction surface which faces said third connecting port and is sensitive to pressure of a pressurized fluid in a braking system of a work machine;
actuation means for actuating sliding of said slider in said seat in contrast with the pressurized fluid that contacts said reaction surface, said actuation means comprising first elastic means and second elastic means, said second elastic means being arrangeable interposed, in a condition of preloading, between a first abutment element associated with a first end of said slider and a second abutment element arranged inside said casing; and
manual actuation means for manually actuating loading and unloading of said second elastic means,
wherein said first elastic means are arranged interposed between said casing and an abutment provided at a second end of said slider so as to directly contrast a thrust of the pressurized fluid against said reaction surface, said second elastic means being adapted to contrast a thrust of said first elastic means by a thrust value equal to that of said preloading.

* * * * *

UNITED STATES PATENT AND TRADEMARK OFFICE
CERTIFICATE OF CORRECTION

| | | |
|---|---|---|
| PATENT NO. | : 7,743,789 B2 | Page 1 of 1 |
| APPLICATION NO. | : 11/524466 | |
| DATED | : June 29, 2010 | |
| INVENTOR(S) | : Eronne Mamei, Omer Mamei and Enrico Mamei | |

It is certified that error appears in the above-identified patent and that said Letters Patent is hereby corrected as shown below:

Title page item (73) should read:
Assignee: Studio Tecnico 6M S.R.L., Modena (IT)

Signed and Sealed this
Eighth Day of February, 2011

David J. Kappos
*Director of the United States Patent and Trademark Office*